INFLATABLE BULKHEAD FOR RAILROAD CAR

Original Filed May 19, 1967 3 Sheets-Sheet 1

INVENTORS
NEUBERNE H. BROWN JR.
DAVID P. BUTLER
JACK M. CARTER
MICHAEL FERIK
PAUL E. OGLE
BY Bair Freeman & Molinare
ATTORNEYS.

INFLATABLE BULKHEAD FOR RAILROAD CAR

Original Filed May 19, 1967 3 Sheets-Sheet 2

INFLATABLE BULKHEAD FOR RAILROAD CAR

Original Filed May 19, 1967 3 Sheets-Sheet 3

United States Patent Office

Re. 27,615
Reissued Apr. 17, 1973

27,615

INFLATABLE BULKHEAD FOR RAILROAD CAR

Neuberne H. Brown, Jr., Colts Neck, N.J., David P. Butler, New City, and Jack M. Carter, White Plains, N.Y., Michael Ferik, Metuchen, N.J., and Paul E. Ogle, Elmwood Park, Ill.; said Frank assignor to said Ogle and said Brown, said Butler and said Carter assignors to General Foods Corporation Original No. 3,427,997, dated Feb. 18, 1969, Ser. No. 639,696, May 19, 1967. Application for reissue Feb. 3, 1971, Ser. No. 112,440

Int. Cl. B60p *7/14;* B61d *45/00*

U.S. Cl. 105—369 BA 15 Claims

Matter enclosed in heavy brackets [ ] appears in the original patent but forms no part of this reissue specification; matter printed in italics indicates the additions made by reissue.

ABSTRACT OF THE DISCLOSURE

This specification discloses inflatable cushioning bulkheads for protecting lading in a freight car by locking the lading against the end of the car or against another of the bulkheads. Each bulkhead consists of three rigid panels made from sheet metal, plywood, or the like, mounted on a frame with inflatable rubber bags sandwiched between the center and each of the end panels. The bulkhead may be expanded many times its original thicnkess by inflating the bags. The end panels are free to move toward and away from the center panel which is fixed to the car. The bags cushion the lading with a resilient resisting force which increases with the load imposed on the outer panel by the inertia of the lading. Links maintain the panels in parallel relation in all positions, from fully closed to fully opened. Means in the form of a pipe accessible through the end panels is provided to actuate latches at the top and bottom of the center panels to lock the center panel to the car. The same pipe is also used to conduct air to the inflatable bags and is accessible at the edge of the center panel. In an alternative form the center panel is built into the car as a stationary load bearing member.

Background of the invention

This invention relates to a system for cushioning cargo or lading in freight-carrying vehicles such as railway freight cars, motor trucks, or the like. More specifically, it relates to expandable bulkheads of sandwich construction comprising three rigid panels with inflatable bags or mattresses interposed between the center and end panels and means for operating said bulkheads within a freight car to shore the lading against damage due to sudden stopping or starting of the car.

It has been proposed heretofore (Scott 2,674,206) to divide the lading into units, dispose inflatable pneumatic members in the space between the units and urge the units against the end walls of the car by inflation of the pneumatic members. Dasey 2,896,867 proposes similar inflatable cushioning units suspended from a trolley at the top of the car. Such cushioning has not provided a satisfactory answer to the shoring problem because the inflated cushion units are not latched to the car. They work upwardly as the lading units shift and vibrate due to motion of the car. Attempts to anchor the inflatable cushions to the floor of the car have been unsuccessful since the forces exerted on the anchors by the moving lading is so great that they break loose. Thus, adjoining lading units move together against the inflated bags at the bottom of the load and gradually force the air into the top of the bags or push the bags themselves toward the top of the car. Once the air cushion is gone the lading is free to shift in any direction and becomes damaged as the car jerks back and forth.

It has also been proposed to equip railroad cars with rigid bulkheads which travel on overhead tracks and latch at the bottom and top to compartmentize the lading. A typical structure of this type is shown in Vanderhyde et al. 3,168,055. Rigid bulkheads of this kind minimize the mass of the lading, but do not expand or contract to accommodate voids in the load. Cars so equipped must be packed with no voids between the individual packages of the lading or between the packages and the bulkhead. As a practical matter, it is not possible to load the cars this tightly. The latching location for the bulkheads are spaced at least three inches apart and this is bound to result in some space between the bulkhead and the lading. Such voids permit slight shifting of the load which increases at an accelerated rate as the lading itself is compressed to produce additional voids.

It has also been suggested that rigid panels separated by inflatable bags be used to separate the lading. These devices separated the lading, but did not truly divide it into units of smaller mass because the separators were not latched to the car. Thus, the entire cargo was able to shift as a single unit. Though the separators were resilient and compressed or expanded with the force imposed, the shock was transmitted through the separators and moved back and forth through the load like a wave.

Summary of the invention

The present invention is designed to obviate the deficiencies in the prior devices just mentioned by providing a bulkhead which not only cushions the load by resiliently resisting shock forces imposed by the inertia of the load, but also compartmentizes the load into separate lading units. The bulkhead will expand to fill all of the space between and within units, not only at the time the car is loaded, but as the size of the load changes in transit. Thus, the invention substantially eliminates voids and effectively cushions the lading by absorbing the shock resulting from shifting the load.

Another object of the invention is to provide an expandable bulkhead having latch-actuating means accessible from the edge and/or either side thereof and an air filler fitting exposed at the edge of the bulkhead for ready filling of the pneumatic bags at the car door after the car has been completely loaded.

Another object is to provide an expandable bulkhead of the type described, having a plurality of panels which are maintained in parallel relation, and which automatically close together and lock when the bags are deflated so that the bulkhead may be moved as a unit from one end of the car to the other on an overhead track.

Another object is to provide an expandable bulkhead comprising a central rigid panel fixed against longitudinal movement within the car and a pair of longitudinally movable panels parallel to said central panel and separated therefrom by inflatable members, the inflatable members being interconnected to permit flow of air therebetween in response to force bearing against said movable panels.

Description of the drawings

FIGURE 4 is a sectional view taken along the line 4—4 of FIGURE 2.

FIGURE 5 is a perspective view of an automatic lock mechanism for securing the outer panels together.

Referring to FIGURE 1, the bulkhead consists of a center panel 10 and cooperating end panels 12 and 14. Each panel is suspended individually from a rod 16 extending from one side of the car to the other which rotates in bearings 18 near the ends thereof. The panel frame is welded to the bearings 18 through blocks 19. Mounted on the ends of the rods 16 are wheels 20 having spokes or studs 21 extending radially from the rolling surface thereof. These wheels run freely in tracks 22 mounted near the top of the railway car at either side thereof. The tracks contain holes 65 to receive the studs 21 on the wheels, thus preventing longitudinal movement of the panels when the shaft 16 is locked against rotation. A chain 23 trained about a gear 25 fixed to shaft 16 of the center panel 10 facilitates moving the bulkhead against the lading at the top. Means not shown may be provided for locking the chain 23 to prevent movement at the top of the bulkhead until the latches are actuated. To lock the bulkhead securely at the bottom and top thereof and thereby divide the lading into units, latching studs are provided on the center panel which cooperate with depressions in fixed members at the top and bottom of the car.

Figure 1:
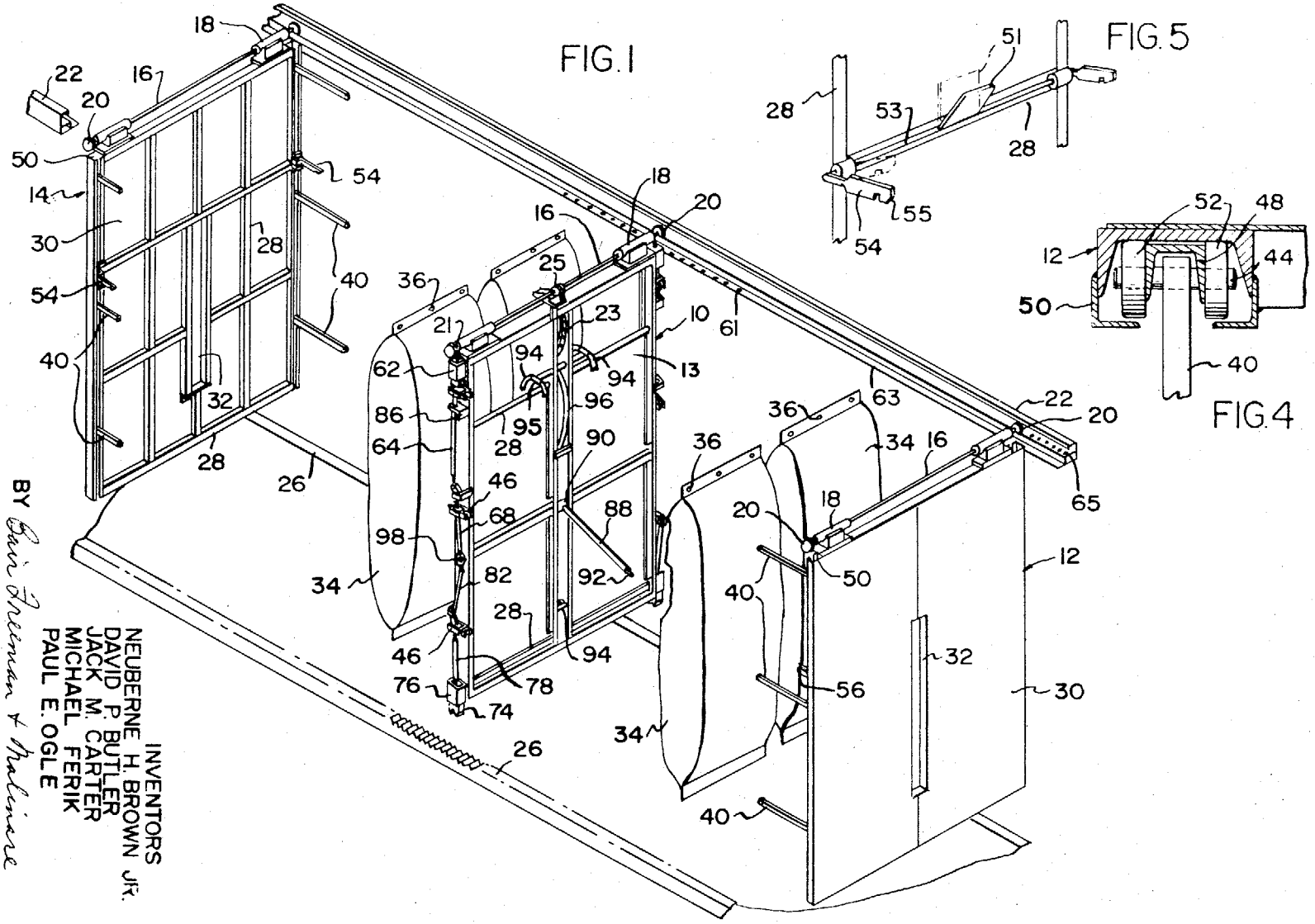
FIGURE 1 is an exploded perspective view of the bulkhead construction of the invention showing the individual components of a single bulkhead and the suspension and latching means comprising part of the railway freight car.

The end panels 12 and 14 are of identical construction and consist of a frame made from tubular stock 28 to which an outer panel 30 is secured by welding or other suitable means. The panel may be made from plywood if desired and attached by means of fasteners. An opening 32 is provided in the framework and a similar opening is cut in the panel 30 to provide access to the actuating means for the latching studs as described below.

Interposed between the center panel 10 and the end panels 12 and 14 are inflatable pnuematic bags 34. The bags are approximately one-half as wide as the panels and extend the full length thereof. Preferably two bags are provided between adjacent panels, with lateral spacing therebetween coincident with the opening 32 through the end panels. The bags are made from rubber-coated fabric, preferably more than one-ply so that they will withstand the considerable forces imposed by the inertia of the load when the railway car is in motion. Grommets 36 are provided in a flange at the top of each bag and an extendable cord such as elastic rope 38 is provided to suspend the bags from the panels. Grommets and connecting ropes may also be used at other points about the periphery of the bags. The securing means for the bags must be resilient to accommodate change in dimensions of the bags due to expansion and contraction.

Figure 2:
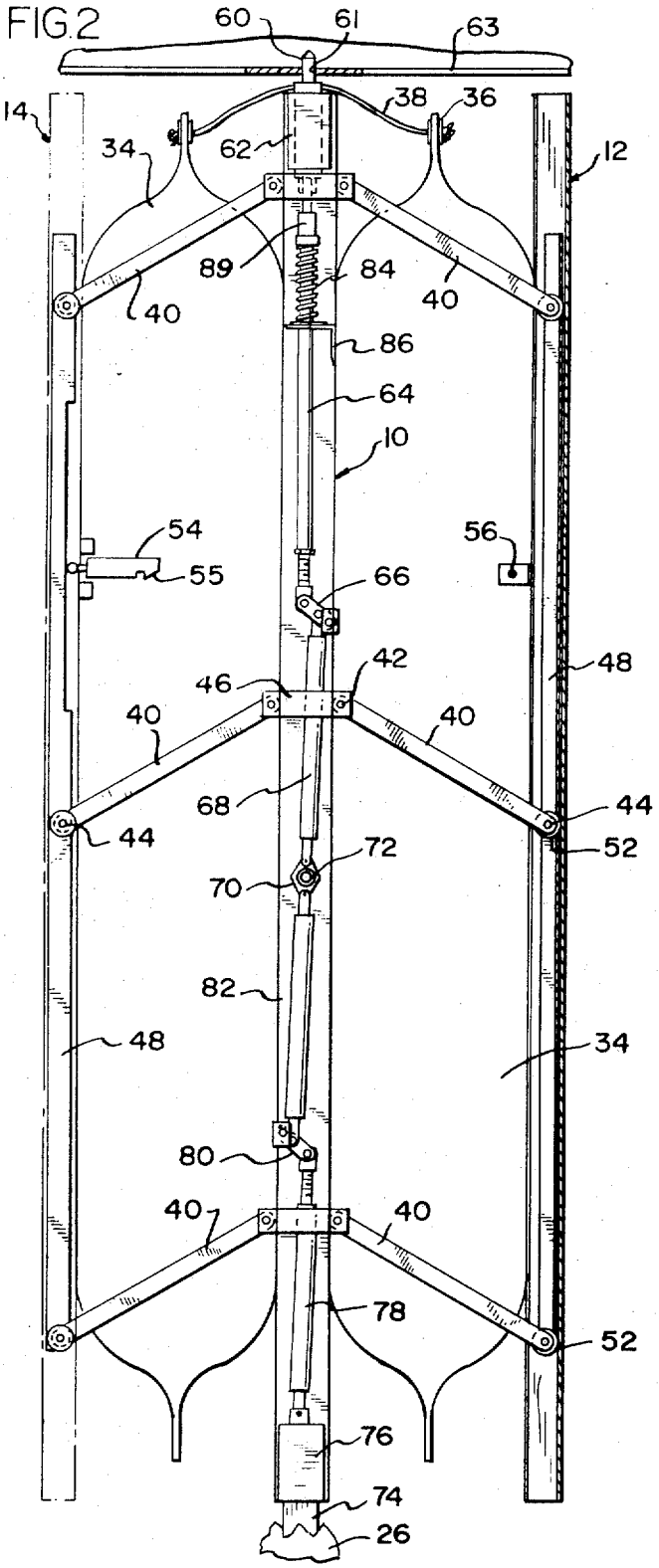
FIGURE 2 is an end view of a bulkhead constructed in accordance with the invention showing the bulkhead in partially inflated condition.

The panels are locked together by means of links 40 pivotally connected at their ends to pins 42 fixed to the center panel and pins 44 movable with respect to the end panels. Preferably there are three sets of links mounted in vertically spaced relation on each end of the bulkhead, as best shown in FIGURE 2. Box-like brackets 46 are welded to the ends of the center panel adjacent the side walls of the car at three locations—the top, the center, and the bottom. The ends of the brackets are bifurcated and have openings therethrough to provide a mounting for the pins 42. The brackets 46 have a central opening to permit the latching linkage to extend therethrough as shown in FIGURE 1. The outer ends of the links 40 are pivotally secured to the pins 44 mounted on relatively heavy rods 48 at each side of each end panel. The rods 48 slide up and down in tracks 50 comprising part of the frame of the end panels 12 and 14. The pins 44 also serve as a stub shaft on which wheels 52 are mounted. The wheels serve as trucks to facilitate vertical movement of the rod 48 up and down within the vertical side members of the frame at either side of the end panels, as best shown in FIGURE 4. The weight of the rods 48 tend to move the pins downwardly to cause the end panels to move in toward the center paned by action of the links 40. Alternatively, springs (not shown) may be provided on the frame to bias the rods downwardly. It is only the interposition of the bags 34 which prevents the panels from closing together. When the bags 34 are completely deflated, the panels assume the relative position shown in FIGURE 3.

In order to lock the outer panels together, a pair of latches 54 is provided, one at either side of the panel 14, and cooperating pins are provided on the panel 12 as shown in FIGURE 2. When the outer panels move together, the cam surface 55 on the latch 54 slides up the side of the pin 56 and locks therewith to secure the end panels together at both sides. Thus, the bulkhead may be moved longitudinally of the car on the tracks 22 as a unit.

In a modified form of the invention, the latches 54 are fixed to the end of a rod 53 extending laterally of the panel 14 and mounted for rotation thereon as shown in FIGURE 5. A plate 51 welded to the rod is normally biased by a spring to a position inclined about 20° toward the center panel. The plate assumes this inclined position when the bags are deflated and the latch is locked. When the bags are inflated, the plate is rotated into the plane of the panel 14, thus causing the rod 53 to rotate and lift the latch 54 so that the end panels are unlocked and are free to move away from the center panel.

The parallelogram linkage provided by the links 40 and the cooperating fixed pins 42 and movable pins 44 serve to maintain the panels in parallel relation at all times. As the bags 34 are inflated, the end panels are forced away from the center panel, the movable ends of the links 40 moving upwardly and outwardly as the rods 48 move upwardly in their tracks 50. When the bags are fully inflated, the links are in substantially horizontal position.

For latching the bulkhead with respect to the car, we have provided a stud 60 at the top which cooperates with openings 61 in the strip 63 secured to the lower portion of the track 22. At the lower end of the center panel a foot 74 is provided having a V-shaped depression therein which is of the same configuration as the rack 26 mounted on the floor of the car. A duplicate pair of latching means is provided on the other side of the center panel 10. The stud 60 moves up and down within the bearing 62 welded to the side of the frame of panel 10. The up and down motion of the stud 60 to move it into and out of engagement with the openings 61 is produced through the action of rod 64, lever 66, and rod 68. The end of rod 68 is pivotally connected to the upper end of lever 70 fixed to the end of a pipe or hollow rod member 72 running laterally of the panel 10 and mounted for rotation on the frame thereof. The foot 74 moves up and down within the bearing 76 welded to the lower end of the edge of panel 10. In like manner, the foot 74 is actuated by rod 78, lever 80, and rod 82. The upper end of rod 82 is pivotally connected to the lower end of the lever 70. Thus, when the pipe 72 is rotated from the position shown in FIGURE 2 to the position shown in FIGURE 3 (counterclockwise), the lever 70 turns through 90° lifting the foot 74 from engagement with the rack 26 and simultaneously removing the stud 60 from the opening 61. In this position, the bulkhead is free to move along the tracks to any position within the freight car.

The latching studs 74 and 60 are normally engaged with the cooperating latching member as shown in FIGURE 2 by reason of the force imparted to the rod 64 by means of the coil spring 84. The bottom of the spring 84 is seated on the bracket 86 welded to the edge of the panel frame and the spring is compressed by the sleeve 89 fixed to the shaft 64 by means of a set screw.

The latch is actuated by means of an actuating lever 88 rigidly fixed to the pipe 72 at the point 90, midway between the sides of the panel 10. At the outer extremity of the actuating lever 88, we have provided a telescoping pin 92 which fits into an opening 94 in the frame of the panel 10. When the studs 60 and 74 are in the latched position, the actuating lever 88 is in the plane of the panel 10 and is locked to the frame. To unlatch the bulkhead, the actuating lever 88 is unlatched and pulled outwardly to the position shown in FIGURE 1. The lever may be used to pull the bulkhead to move it along the track 22. As previously indicated, the opening 32 in the end panels 12 and 14 permits the operator to reach the actuating lever 88 so that it can be lifted against the action of spring 84 to unlatch the bulkhead and move it about. When released, the lever will automatically move into the plane of panel 10 due to the force of the spring 84 to latch the bulkhead and thus prevent longitudinal movement thereof within the car.

To inflate the bags 34, we have provided flexible air conduits 94 which lead from the bags to the hose 96 which in turn connects to the interior of the pipe 72. The ends of the pipe 72 extend through the edge of the frame of panel 10 at each side and terminate in valved fittings 98 to which an air hose may be connected. Thus, the bags may be filled by connecting the end 98 of the pipe 72 to a source of compressed air. It will be observed that the pipe 72 serves not only to conduct air to the bags, but to actuate the latch as well. The bags on both sides of the center panel connect to a common conduit 95 which contains no check valves. Thus, air at all times may pass freely from the bags on one side of panel 10 to the bags on the other side depending upon the forces imposed upon the bags.

If it is desired to actuate the latches from the side of the car, the pipe 72 may be extended further beyond the edges of the frame of panel 10 and the lever 88 welded to it at this point, rather than at 90. A second lever may be provided at the opposite side.

Preferably, the center panel 10 has thin metal plates 13 welded within the four spaces defined by the frame members 28. The plates prevent the bags 34 from distending into the openings and reducing the effective thickness of the bags. If the bags become distorted in this manner in transit, slack may result and this in turn permits shifting of the lading.

Figure 3:
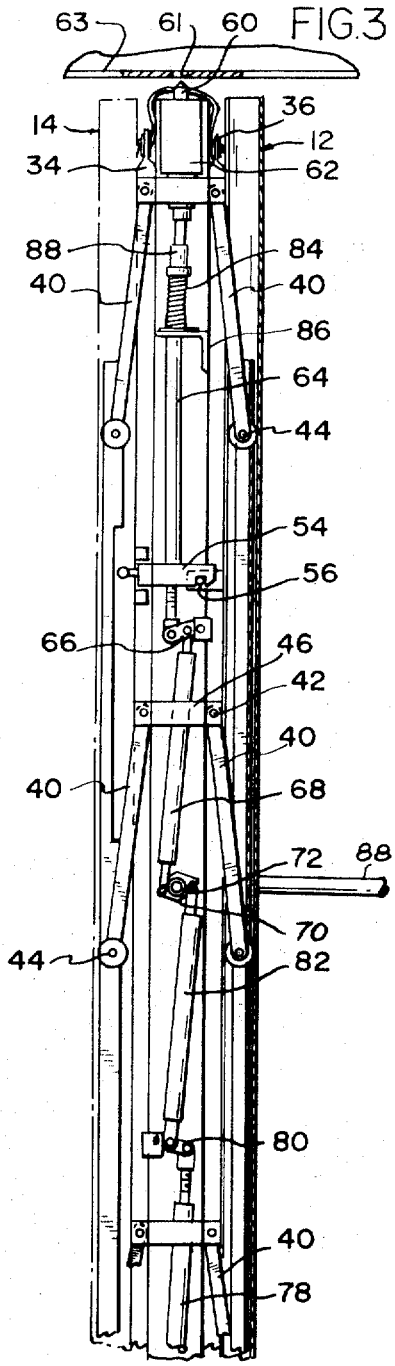
FIGURE 3 is a view similar to FIGURE 2 in which the bulkhead is completed collapsed with the bags deflated.

Although one bulkhead is shown in the drawings and is usually adequate, it will be understood that the car may be equipped with two or more. To load the car, the bulkheads are compressed as indicated in FIGURE 3 with bags 34 deflated. If there are two inflatable bulkheads in the car, these are pushed to one end of the car and the opposite end is loaded until one third of the space in the car is occupied. The two bulkheads are then pushed against the end of the unit load in the car. The opposite end of the car is then loaded to one-third capacity of the car. One of the two bulkheads is then pushed into contact with the exposed end of this unit of lading. Both bulkheads are then latched at the top and the bottom by locking rod 88 at 94. The studs 60 and 74 engage their cooperating latch members and cannot disengage until the lever 88 is lifted. The center third of the car is then loaded to completely fill the car. At this point, an air hose is connected to the valved fitting 98 and the bags are inflated to compress the lading. The bulkheads are designed so that they will expand from about eight inches to about forty inches, although any degree of expansion can be built into the bulkhead by lengthening the links and enlarging the bags.

Because the individual packages in the lading units are compressed against the end of the car or against an adjacent bulkhead, the friction between the packages prevents them from falling laterally. For this reason, it is not necessary to provide side filler. This is an important advantage of this invention. In prior constructions, the bulkheads were not capable of holding lading in this fashion and consequently side fillers were required to prevent individual packages in a lading unit, which does not fit the car, from toppling into the side space. Side filler is a source of constant irritation to carriers, primarily because it becomes damaged so frequently during loading and requires repair or replacement.

In cars equipped with the bulkhead of the invention, the lading unit remains intact because the bulkheads are capable of expanding to take up any voids in the lading which might result from jostling the load. Although the center panel is locked, the outer panels are free to move independently back and forth against the bags as forces are imposed by the lading. It is this yielding which cushions the lading. Yet the lading is effectively divided into units of reduced mass because the forces imposed by one unit are not transferred through the bulkhead to the adjoining unit, instead they are resisted by the locked center panel. By reason of the parallelogram linkage, the outer panels which are in contact with the lading remain perfectly parallel and there is no tendency for the lading to work the bulkheads upwardly as is the case where inflatable dunnage bags are used without rigid panels adjacent thereto.

It will be noted that the combination of a fixed center panel and independently movable outer panels permits expansion to different dimensions on either side of the center, thereby providing precisely the amount of flexible filler desired. The quality of the shock absorption provided by the invention is unique. Resistance to shifting of the lading gradually increases as the yielding bags are compressed between the panels. When the slab-shaped bag is inflated it changes from a flat to a rounded contour. Fully inflated bags, therefore, have a larger volume (hence lower air pressure) and a relatively small area in contact with the outer panels. Any force applied to the inflated bulkhead squashes the rounded bag toward its original low volume slab shape. As more of the bag area contacts the panel and the air pressure increases, the resistance to the force increases. The result is a resilient yielding akin to a baseball catcher catching a ball by drawing back his mitt upon impact. Lading thrown against the inflated bulkhead is gently cushioned with a resisting force proportional to the thrust. No damage to the lading results. In similar manner, when the lading is compressed to eliminate voids upon initial inflation, the force imposed on the lading is reduced as the packages are pushed closer together, again avoiding damage to the lading.

It will be appreciated that because the air bags on either side of the fixed panel are interconnected, some of the air from the compressed bags will flow into the bags on the opposite side of the panel, which have been relieved to some extent due to movement of the lading away from the bags on that side. This flow of air automatically minimizes changes in pressure that would result due to inertia of the lading if the bags were not interconnected. By maintaining the pressure in the bags at approximately the desired predetermined level, the force on the lading remains approximately constant to keep the individual packages "locked in" by friction and to prevent lateral tumbling.

When the car reaches its destination, the air is released by opening a valve in the fitting 98 to permit the bags 34 to deflate. The weight of the rods 48 then causes the bulkhead to close to the position shown in FIGURE 3. The outer panels are automatically latched together by means of the latches 54. After the cargo has been removed from the center section of the car, the bulkhead is unlatched from the rack 26 and the strip 63 by releasing the actuating lever 88. The bulkheads then will move freely from one end of the car to the other as desired. If extra cushioning is desired, two additional bulkheads may be used, one at either end of the car adjacent the end members.

Various modifications of the bulkhead construction of our invention will be apparent to those skilled in the art.

For example, the bulkhead may be vertically divided to accommodate lading of various sizes on either side of the car. The number of slab-like pneumatic bags covering a railroad car bulkhead may vary from one to four.

In another form of the invention, means other than the disclosed linkage may be used to maintain parallelism between the center and end panels. For example, pairs of racks like 26 may be mounted on the floor and top of the car to cooperate with pinions fixed to a rotatable shaft at the top and bottom of the panels. The rotation of the pinions at the top and bottom may be synchronized by a roller chain trained about sprockets coupled to the pinion shaft. Thus, when the movable panels are installed in the car, they are mounted vertically and are maintained in this attitude because the top and bottom must move in unison by reason of the coupled sprockets on the pinion shaft. Other means for maintaining parallelism will be apparent to those skilled in the art.

It will also be appreciated that although the illustrative form of the invention uses a movable center panel which latches to the car, the center panel need not be movable. For example, the bulkhead of the invention may be permanently installed at the midpoint of the car.

Figure 6:
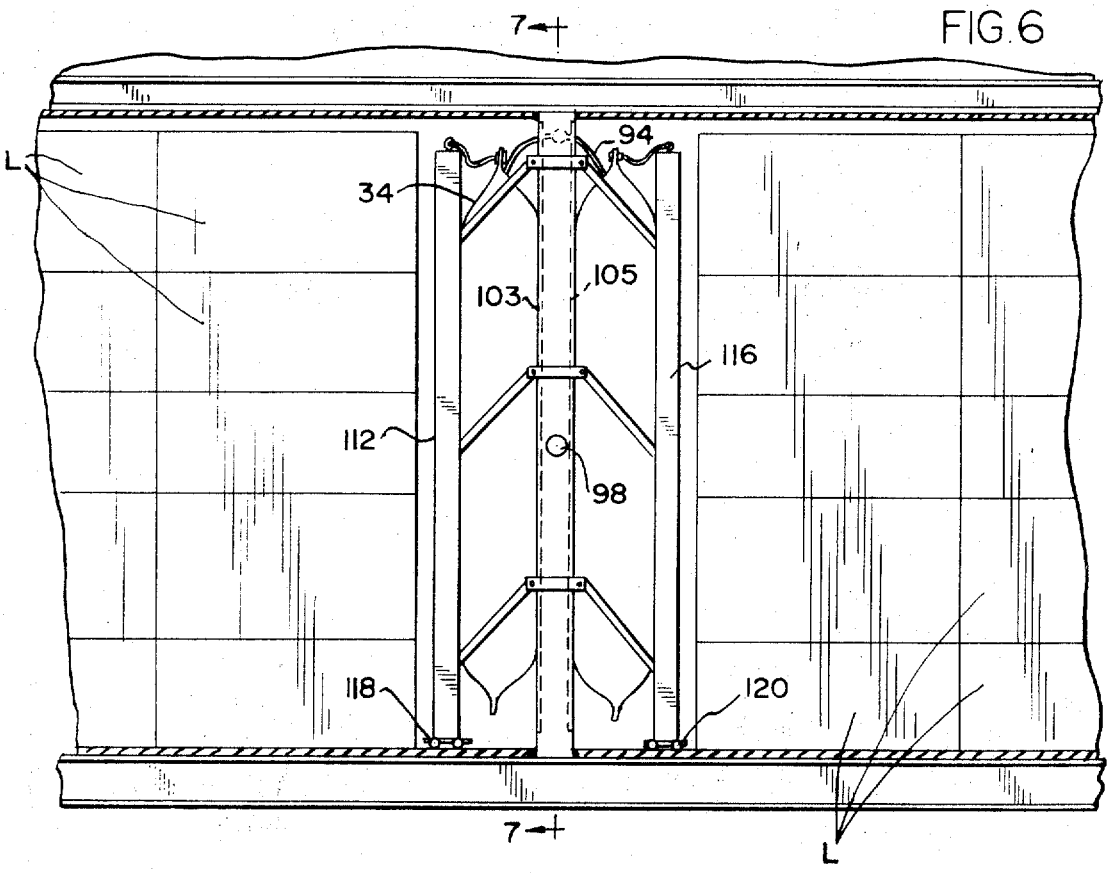
FIGURE 6 is a longituddinal sectional view of a freight car showing an alternative construction in which the center panel of the inflatable bulkhead is built into the car.
Figure 7:
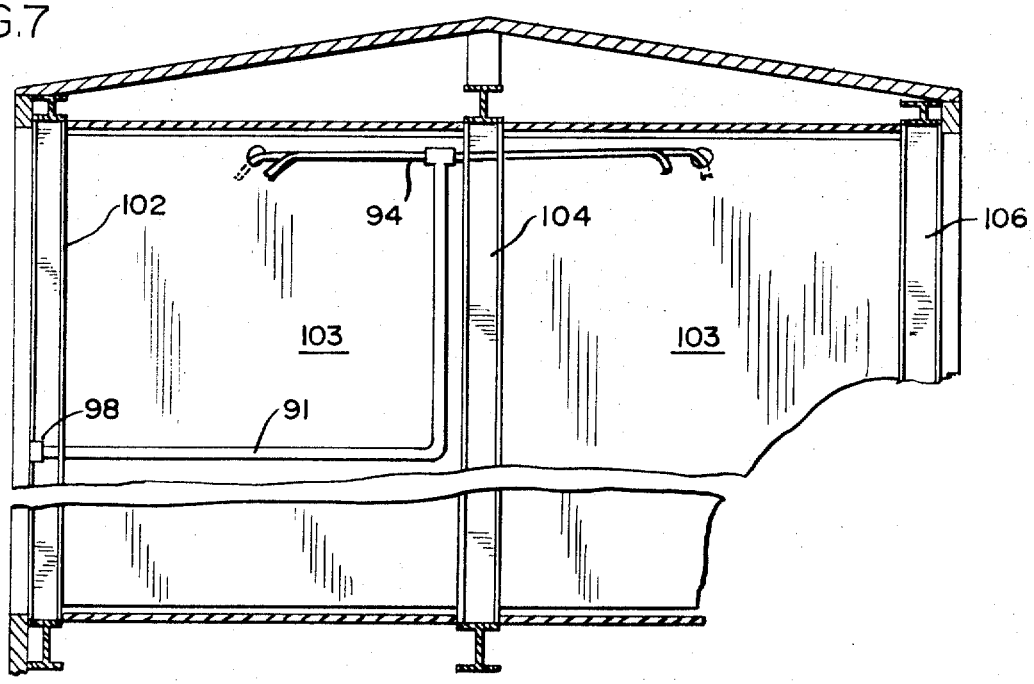
FIGURE 7 is a sectional view taken along the line 7—7 of FIGURE 6.

Such a construction is illustrated in FIGURES 6 and 7. The center panel here comprises a rigid frame built into the car, consisting of stud members 102, 104, 106 welded or otherwise secured at the bottom and the top to the longitudinal beams of the car. The frame is covered on both sides with smooth panels 103, 105. The air supply is fed to the bags 34 through pipe 91 which connects to a manifold and tubing 94 as previously described in the form of the invention shown in FIGURE 1. Air inlet fitting 98 is valved so that air may flow in or out by unscrewing the plug. The bags 34 are identical to those previously described. The movable panels 112, 116 are tied to the fixed center bulkhead by the parallelogram linkage, but roll on trucks 118, 120 instead of being suspended from the roof or top of the car. The movable panels expand to compress the lading L toward opposite ends of the car.

This construction is economical to manufacture and has certain structural advantages over the movable bulkheads of FIGURES 1–5. By using the stud members 102, 104, and 106 as load bearing members, great rigidity is imparted to the car and the roof beams can be made lighter. This is especially important in cars which are 50 or 60 feet long or cars which have long doors at the sides. Of course, in this construction all of the rails, tracks, and latching mechanisms are dispensed with.

It is claimed:

1. A movable, expandable bulkhead assembly for dividing and cushioning lading in a freight car comprising a center panel and a pair of end panels one on each side of said center panel, each panel being independently suspended from the top of said car for travel lengthwise of said car, inflatable bags disposed between said center and end panels, link means pivotally connecting a set of pins on said end panels with a set of pins on said center panel to provide a parallelogram linkage to maintain said panels in substantially parallel relation, one set of said pivot pins being fixed and the other set being vertically movable with respect to the panel on which they are mounted, whereby said end panels move toward and away from said center panel to provide variable cushioning thickness according to the extent said bags are distended, and means for latching said center panel against longitudinal movement with said car.

2. The bulkhead assembly of claim 1 in which said set of fixed link pins are mounted on said center panel and said end panels carry vertical track means, movable slides for traversing said track means, and said set of movable link pins mounted on said slides, whereby the downward movement of said slides cause the links to close said bulkhead when said bags are deflated.

3. A movable expandable bulkhead assembly for dividing and cushioning lading in a freight car comprising a center panel and a pair of end panels one on each side of said center panel, each panel being independently mounted for travel lengthwise of said car, inflatable bags disposed between said center and end panels, conduit means extending across said center panel interconnecting the bags on either side thereof to conduct air freely therebetween, link means connecting said end panels to said center panel at the side edges thereof to maintain the said panels in substantially parallel relation whereby said end panels move toward and away from said center panel to provide variable cushioning thickness according to the extent said bags are distended, and means for latching said center panel against longitudinal movement within said car.

4. The bulkhead assembly of claim 3 which includes a pair of cooperating latch members, one mounted on each of said end panels, which members mate to lock said bulkhead in closed position when said bags are deflated.

5. The bulkhead assembly of claim 3 in which said center panel carries air tubing for inflating said bags, said tubing connecting to said conduit means and terminating at the side of said center panel in an air filler fitting so that the bags may be inflated after the car is loaded.

6. The bulkhead assembly of claim 3 in which said center panel latching means comprises stud means mounted at the top and bottom of said panel and cooperating slot means at the roof and the floor of said car, and actuating means for said stud means accessible through openings in either of said end panels.

7. The bulkhead assembly of claim 6 in which said actuating means includes a laterally disposed pipe mounted for rotation on said center panel, said pipe being linked to said stud means and having an air fitting on at least one end thereof, said conduit means communicating with said pipe, and said actuating means is connected to said pipe.

8. The bulkhead assembly of claim 3 in which said center and end panels comprise a frame and a skin mounted on said frame for distributing evenly the force imparted to said skin by inflating said bags against lading adjacent said bulkhead.

9. The bulkhead assembly of claim 1 which includes a rotatable shaft mounted laterally on one of said end panels, a latch member fixed to each end of said shaft, a plate projecting from said shaft intermediate the ends thereof, said plate being normally biased toward said center panel out of the plane of said end panel when said bag is deflated, pin means on the other of said end panels for cooperation with said latch to lock the outer panels together, whereby upon inflation of said bag and plate is pushed into the plane of said panel to rotate the shaft and lift the latch from said pin to automatically unlock the bulkhead.

10. The bulkhead assembly of claim 3 in which said bags are secured to one of said panels by means of stretchable cords.

11. A movable expandable bulkhead assembly for dividing and cushioning lading in a freight car comprising a rigid center panel and a pair of rigid end panels, each panel being independently suspended from supporting members near the top of said car for travel lengthwise of the car, slab-shaped inflatable bags disposed between said center panel and each of said end panels, link means between said center and end panels to provide a parallelogram linkage for maintaining the end panels in parallel relation whether the bags are deflated or fully inflated, latching depressions longitudinally spaced along both sides of the car near the floor and top thereof, studs on said center panel for cooperating with said depressions to lock said panel against longitudinal movement in the car, conduit means mounted on said center panel for conducting air to and between said inflatable bags, and actuating means for said latching studs, whereby upon inflation of said bags the contour thereof changes to increase the volume thereof and decrease the area of said bags in contact with said outer panels, thus providing resilient cushioning having a resisting force proportional to the magnitude of a force imposed upon said outer panel by said lading.

12. A bulkhead assembly for dividing and cushioning lading in a freight car comprising a center panel and a pair of end panels, one on each side of said center panel, a slab-shaped inflatable bag which tends to become rounded when inflated, disposed between said center panel and end panels and being substantially coextensive with said panels, means for securing said center panel against longitudinal movement within said car, said end panels being mounted for longitudinal movement within the car to permit expansion and contraction of said bulkhead, and means interconnecting said panels for maintaining all three in substantially parallel relation, whereby said bulkhead may be expanedd to fill voids in said lading on either side thereof and serves to provide resilient cushioning for said lading against longitudinal shock forces imparted to the lading by movement of the car.

13. The bulkhead assembly of claim 12 in which said center panel is built into the car as a load bearing member.

*14. A bulkhead assembly for dividing and cushioning lading in a freight car comprising*

*a pair of tracks secured to the car near the top thereof*

*panel support means extending across the car and terminating in wheels which roll on said tracks*

*a vertically-disposed locking panel suspended from said support means for travel along the length of the car*

*locking means mounted at the top and bottom of said locking panel*

*means on said car cooperating with said locking means to secure said locking panel in vertical position against longitudinal movement and to divide the lading into units of reduced mass, thereby preventing the transfer of forces from one lading unit to an adjoining lading unit*

*at least one freely movable panel mounted adjacent said locking panel for longitudinal movement with respect thereto*

*linkage means interconnecting said locking and movable panels to maintain the movable panel in parallel relation to the locking panel when the latter is locked to the car and the bulkhead assembly is compressed between units of lading*

*a slab-shaped inflatable bag disposed between said panels, which upon inflation moves said movable panel away from said locking panel to compress the lading, and*

*air filler means at the side of the bulkhead assembly to permit inflating said bag after loading the car.*

*15. The bulkhead assembly of claim 14 which includes releasable latching means for retaining said movable panel in retracted position adjacent said locking panel, and means responsive to inflation of the inflatable bag for automatically releasing said latching means to permit said movable panel to move away from said locking panel.*

UNITED STATES PATENTS

The following references, cited by the Examiner, are of record in the patented file of this patent or the original patent.

References Cited

| | | | |
|---|---|---|---|
| 3,177,816 | 4/1965 | Daberkow | 105—369 BA |
| 3,208,403 | 9/1965 | Magarian et al. | 105—376 |
| 3,017,842 | 1/1962 | Nampa | 105—376 |
| 3,018,740 | 1/1962 | Oakley | 105—375 |
| 3,427,995 | 2/1969 | Stafford, Jr. | 105—369 BA |
| 3,192,879 | 7/1965 | Pier | 105—369 BA |
| 3,673,968 | 7/1972 | Bertram | 105—369 BA |
| 1,517,100 | 11/1924 | Bacon | 105—376 |
| 1,613,057 | 10/1958 | Dasey | 105—369 |
| 3,115,977 | 12/1963 | Mirando | 105—369 |
| 3,145,853 | 8/1964 | Langenberg | 214—10.5 |

DRAYTON E. HOFFMAN, Primary Examiner

U.S. Cl. X.R.

105—376